United States Patent
Hsu et al.

(10) Patent No.: US 10,706,793 B2
(45) Date of Patent: Jul. 7, 2020

(54) ELECTRO-PHORETIC DISPLAY APPARATUS

(71) Applicant: E Ink Holdings Inc., Hsinchu (TW)

(72) Inventors: Hao-Ting Hsu, Hsinchu (TW); Chia-Hao Kuo, Hsinchu (TW); Yu-Jui Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/826,684

(22) Filed: Nov. 30, 2017

(65) Prior Publication Data

US 2018/0158419 A1 Jun. 7, 2018

(30) Foreign Application Priority Data

Dec. 1, 2016 (CN) .......................... 2016 1 1087805

(51) Int. Cl.
*G09G 3/34* (2006.01)
*G02F 1/167* (2019.01)
*G02F 1/1685* (2019.01)
*G02F 1/1676* (2019.01)

(52) U.S. Cl.
CPC .............. *G09G 3/344* (2013.01); *G02F 1/167* (2013.01); *G02F 1/1685* (2019.01); *G02F 1/1676* (2019.01); *G09G 2310/0291* (2013.01); *G09G 2320/0242* (2013.01); *G09G 2330/028* (2013.01)

(58) Field of Classification Search
CPC ................................ G09G 3/344; G02F 1/167
USPC ......................................................... 345/690
See application file for complete search history.

(56) References Cited

U.S. PATENT DOCUMENTS

| | | | | |
|---|---|---|---|---|
| 6,831,662 B1* | 12/2004 | Lum | ............... | G09G 3/3622 345/100 |
| 2005/0104844 A1* | 5/2005 | Nakai | ................ | G09G 3/3446 345/107 |
| 2007/0216623 A1* | 9/2007 | Kimura | ............... | G09G 3/2011 345/89 |
| 2008/0158143 A1 | 7/2008 | Kim et al. | | |
| 2008/0284700 A1* | 11/2008 | Oke | ................... | G09G 3/3614 345/89 |
| 2010/0033451 A1* | 2/2010 | Shinn | .................. | G02B 26/004 345/204 |

(Continued)

FOREIGN PATENT DOCUMENTS

CN 1860513 11/2006
CN 201945779 8/2011
(Continued)

OTHER PUBLICATIONS

"Office Action of China Counterpart Application," dated Apr. 24, 2019, p. 1-p. 6.

*Primary Examiner* — Fred Tzeng
(74) *Attorney, Agent, or Firm* — JCIPRNET

(57) ABSTRACT

An electro-phoretic display apparatus including an electro-phoretic display panel and a driving circuit is provided. The electro-phoretic display panel includes a display area and a border area. The driving circuit is coupled to the electro-phoretic display panel. The driving circuit is configured to drive the display area to display an image frame according to a first voltage. The driving circuit drives the border area to maintain displaying a white border or a black border according to a second voltage.

9 Claims, 3 Drawing Sheets

(56) References Cited

U.S. PATENT DOCUMENTS

| | | | | |
|---|---|---|---|---|
| 2010/0302809 A1* | 12/2010 | Kosaka | ............... | G03G 15/80 |
| | | | | 363/15 |
| 2011/0181569 A1* | 7/2011 | Liu | ............... | G09G 3/344 |
| | | | | 345/208 |
| 2012/0098740 A1* | 4/2012 | Chiu | ............... | G09G 3/344 |
| | | | | 345/107 |
| 2012/0099180 A1* | 4/2012 | Chiu | ............... | G09G 3/344 |
| | | | | 359/296 |
| 2012/0293480 A1 | 11/2012 | Lin et al. | | |
| 2014/0085355 A1* | 3/2014 | Chang | ............... | G09G 3/344 |
| | | | | 345/691 |
| 2015/0070601 A1* | 3/2015 | Lin | ............... | G02F 1/13338 |
| | | | | 349/12 |
| 2016/0118370 A1* | 4/2016 | Wu | ............... | H01L 25/167 |
| | | | | 362/19 |
| 2018/0068632 A1* | 3/2018 | Wu | ............... | G06F 1/3265 |
| 2018/0151650 A1* | 5/2018 | Ha | ............... | G09G 3/3233 |

FOREIGN PATENT DOCUMENTS

| | | |
|---|---|---|
| CN | 202816272 | 3/2013 |
| CN | 103377613 | 10/2013 |
| CN | 104269147 | 1/2015 |
| TW | 538263 | 6/2003 |
| TW | 200819891 | 5/2008 |
| TW | I554999 | 10/2016 |

\* cited by examiner

ELECTRO-PHORETIC DISPLAY APPARATUS

CROSS-REFERENCE TO RELATED APPLICATION

This application claims the priority benefit of China application serial no. 201611087805.X, filed on Dec. 1, 2016. The entirety of the above-mentioned patent application is hereby incorporated by reference herein and made a part of this specification.

BACKGROUND OF THE INVENTION

Field of the Invention

The invention relates to a display apparatus, and particularly relates to an electro-phoretic display apparatus.

Description of Related Art

Generally, applications of electro-phoretic display apparatus are divided into two types. One type is to connect an electro-phoretic display panel to a predetermined driving voltage, such that an image thereof may flash black and flash white along with a variation of the driving voltage. Another type of the application is to connect a border area of the electro-phoretic display panel to a common electrode voltage, such that a display color thereof is not changed to maintain a predetermined border color. Although the later type may decrease circuit complexity of a system end, since the border area connected to the common electrode voltage is easy to produce a gray border phenomenon, it may cause a distortion phenomenon.

SUMMARY OF THE INVENTION

The invention is directed to an electro-phoretic display apparatus, which may mitigate a distortion phenomenon of a border area thereof.

The invention provides an electro-phoretic display apparatus including an electro-phoretic display panel and a driving circuit. The electro-phoretic display panel includes a display area and a border area. The driving circuit is coupled to the electro-phoretic display panel. The driving circuit is configured to drive the display area to display an image frame according to a first voltage. The driving circuit drives the border area to maintain displaying a white border or a black border according to a second voltage.

In an embodiment of the invention, the driving circuit generates the second voltage according to the first voltage.

In an embodiment of the invention, the driving circuit drives the border area to maintain displaying the white border according to the second voltage. The driving circuit increases an absolute value of the first voltage to produce an absolute value of the second voltage, and the absolute value of the second voltage is higher than the absolute value of the first voltage.

In an embodiment of the invention, the driving circuit includes an operation amplifier, a first resistor and a second resistor. The operation amplifier has a first input terminal, a second input terminal and an output terminal. The first input terminal of the operation amplifier receives the first voltage. The output terminal of the operation amplifier outputs the second voltage. The first resistor has a first terminal and a second terminal. The first terminal of the first resistor is coupled to the output terminal of the operation amplifier. The second terminal of the first resistor is coupled to the second input terminal of the operation amplifier. The second resistor has a first terminal and a second terminal. The first terminal of the second resistor is coupled to the second input terminal of the operation amplifier, and the second terminal of the second resistor is coupled to a ground voltage.

In an embodiment of the invention, the driving circuit drives the border area to maintain displaying the black border according to the second voltage. The driving circuit decreases an absolute value of the first voltage to produce an absolute value of the second voltage, and the absolute value of the second voltage is lower than the absolute value of the first voltage.

In an embodiment of the invention, the driving circuit includes a first resistor and a second resistor. The first resistor has a first terminal and a second terminal. The first terminal of the first resistor receives the first voltage. The second terminal of the first resistor outputs the second voltage. The second resistor has a first terminal and a second terminal. The first terminal of the second resistor is coupled to the second terminal of the first resistor. The second terminal of the second resistor is coupled to a ground voltage.

In an embodiment of the invention, the first voltage and the second voltage are negative voltages.

In an embodiment of the invention, the first voltage is a common electrode voltage of the display area.

In an embodiment of the invention, the driving circuit is disposed on the electro-phoretic display panel.

In an embodiment of the invention, the driving circuit is disposed outside the electro-phoretic display panel.

According to the above description, in the exemplary embodiment of the invention, the driving circuit drives the border area of the electro-phoretic display panel according to the second voltage, so as to mitigate the distortion phenomenon.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
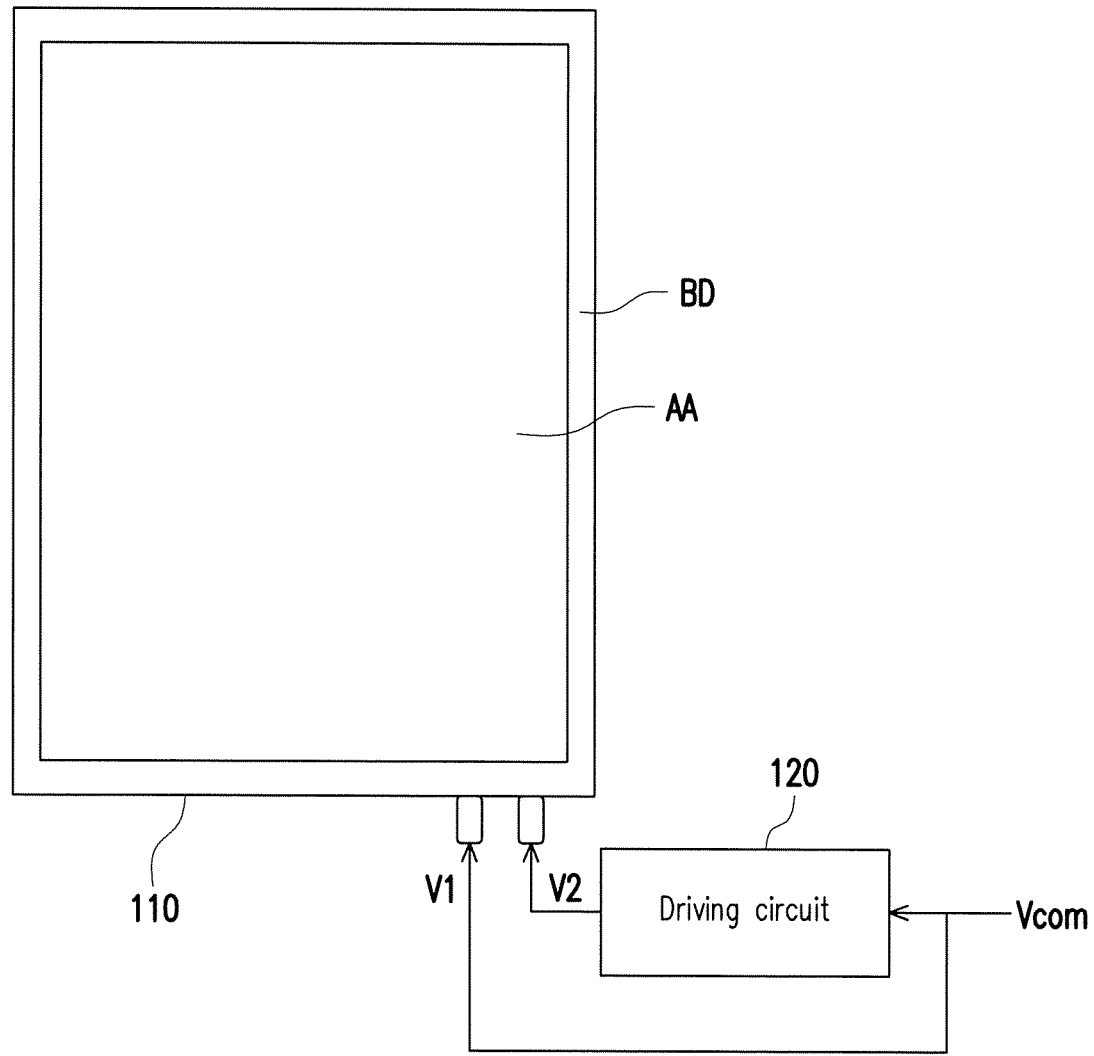
FIG. 1 is a schematic diagram of an electro-phoretic display apparatus according to an embodiment of the invention.

FIG. 1 is a schematic diagram of an electro-phoretic display apparatus according to an embodiment of the invention. Referring to FIG. 1, the electro-phoretic display apparatus 100 of the present embodiment includes an electro-phoretic display panel 110 and a driving circuit 120. The electro-phoretic display panel 110 includes a display area AA and a border area BD. The driving circuit 120 is coupled to the electro-phoretic display panel 110. The driving circuit 120 drives the display area AA to display an image frame according to a first voltage V1. The driving circuit 120 drives the border area BD to maintain displaying a white border or a black border according to a second voltage V2. In the present embodiment, the first voltage V1 is, for example, a common electrode voltage used for driving the display area AA to display the image frame.

In the present embodiment, the driving circuit 120 is, for example, an external circuit independently disposed outside the electro-phoretic display panel 110. Alternatively, in an embodiment, the driving circuit 120 is, for example, an internal circuit disposed on a peripheral circuit configuration area (not shown) of the electro-phoretic display panel 110. The configuration position of the driving circuit 120 is not limited by the invention.

Figure 2:
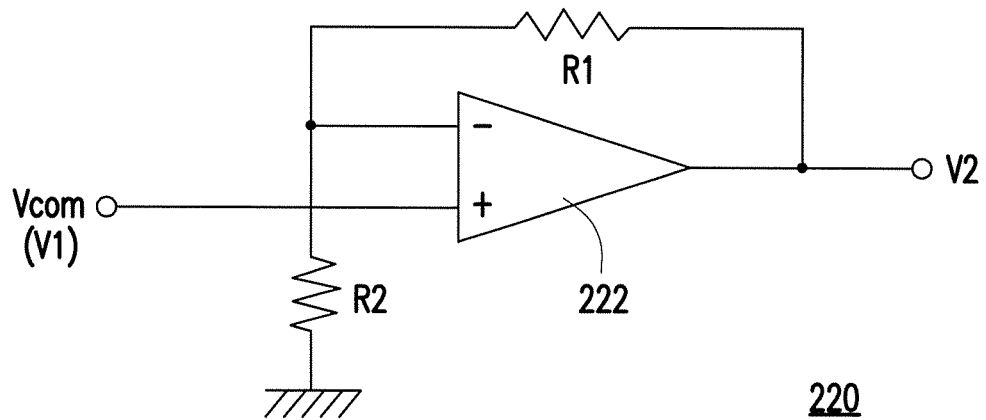
FIG. 2 is a schematic diagram of an internal circuit structure of a driving circuit according to an embodiment of the invention.
Figure 3:
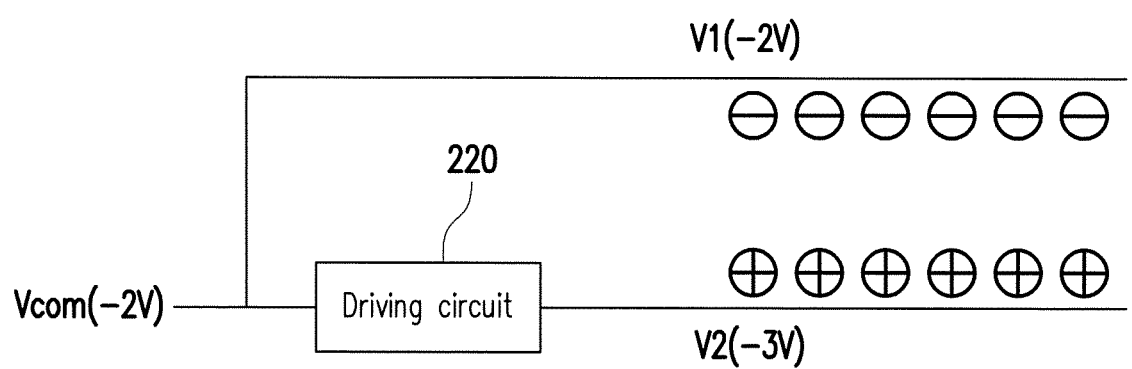
FIG. 3 is a waveform schematic diagram of a first voltage and a second voltage of the embodiment of FIG. 2.

FIG. 2 is a schematic diagram of an internal circuit structure of the driving circuit according to an embodiment of the invention. FIG. 3 is a waveform schematic diagram of the first voltage and the second voltage of the embodiment of FIG. 2. Referring to FIG. 2 and FIG. 3, the driving circuit 220 of the present embodiment, for example, generates the second voltage V2 according to the first voltage V1. The first voltage V1 is, for example, the common electrode voltage used for driving the display area AA to display the image frame.

In the present embodiment, the driving circuit 220 includes an operation amplifier 222, a first resistor R1 and a second resistor R2. The operation amplifier 222 has a first input terminal (a non-inverted input terminal), a second input terminal (an inverted input terminal) and an output terminal. The first input terminal of the operation amplifier 222 receives the first voltage V1. The second input terminal of the operation amplifier 222 is coupled to a second terminal of the first resistor. The output terminal of the operation amplifier 222 outputs the second voltage V2. The first resistor R1 has a first terminal and the second terminal. The first terminal of the first resistor R1 is coupled to the output terminal of the operation amplifier 222. The second terminal of the first resistor R1 is coupled to the second input terminal of the operation amplifier 222. The second resistor R2 has a first terminal and a second terminal. The first terminal of the second resistor R2 is coupled to the second input terminal of the operation amplifier 222, and the second terminal of the second resistor R2 is coupled to a ground voltage GND.

In the present embodiment, the operation amplifier 222 of the driving circuit 220, for example, has a circuit configuration of an in-phase amplifier. The operation amplifier 222 feeds back the second voltage V2 to the second input terminal thereof, such that the first voltage V1 and the second voltage V2 are the same. By using the in-phase amplifier, an absolute value of the first voltage V1 is increased to an absolute value of the second voltage V2, such that electro-phoretic particles are maintained to a predetermined position thereof. Therefore, in the present embodiment, the driving circuit 220 increases the absolute value of the first voltage V1 to produce the absolute value of the second voltage V2, so that the absolute value of the second voltage V2 is higher than the absolute value of the first voltage V1. For example, in the present embodiment, the driving circuit 220, for example, adjusts the first voltage V1 of −2 volts (V) to the second voltage V2 of −3 V. The first voltage V1 and the second voltage V2 are all negative voltages, and the absolute value of the second voltage V2 is higher than the absolute value of the first voltage V1. In the present embodiment, the first voltage V1 of −2 V and the second voltage V2 of −3 V are only used as an example, and voltage values thereof are not limited by the invention.

In the present embodiment, the driving circuit 220, for example, drives the border area BD to maintain displaying the white border according to the second voltage V2. When the border area BD of the electro-phoretic display panel 110 is driven to display a white color, the driving circuit 220 outputs the second voltage V2 to the border area BD according to the first voltage V1, for example, adjusts the first voltage V1 of −2 V to the second voltage V2 of −3 V. Based on a voltage difference between the first voltage V1 and the second voltage V2, the white electro-phoretic particles are maintained to the predetermined position thereof, such that the border area BD maintains displaying the white border without distortion. Therefore, the border area BD maintaining displaying the white border may enlarge a visual effect of a viewing zone of the display area AA with a white background.

Figure 4:
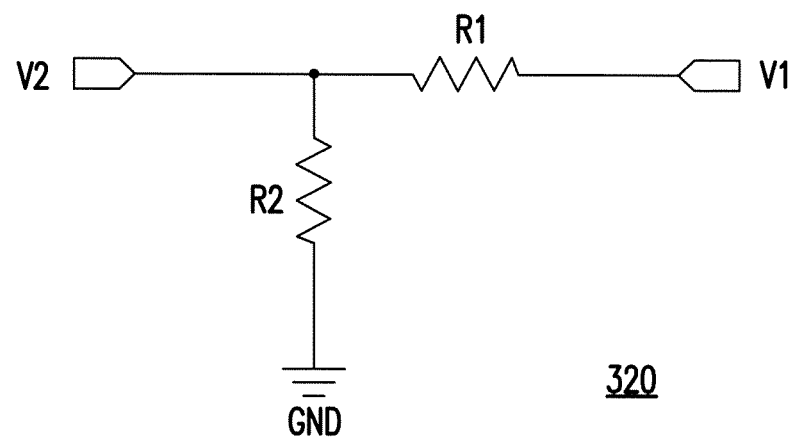
FIG. 4 is a schematic diagram of an internal circuit structure of a driving circuit according to another embodiment of the invention.
Figure 5:
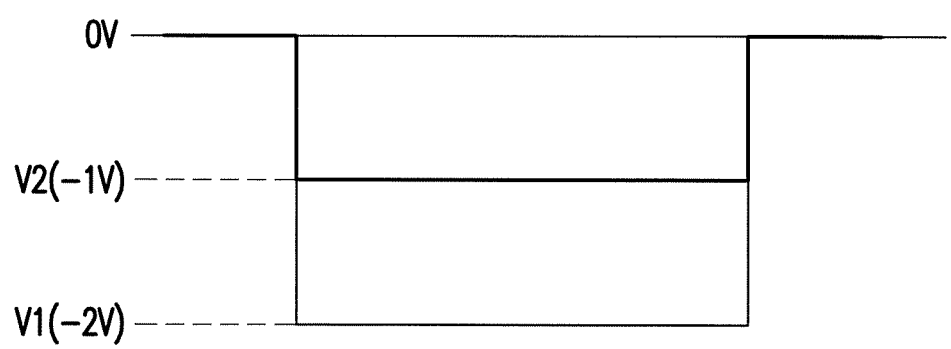
FIG. 5 is a waveform schematic diagram of a first voltage and a second voltage of the embodiment of FIG. 4.

FIG. 4 is a schematic diagram of an internal circuit structure of the driving circuit according to another embodiment of the invention. FIG. 5 is a waveform schematic diagram of the first voltage and the second voltage of the embodiment of FIG. 4. Referring to FIG. 4 and FIG. 5, the driving circuit 320 of the present embodiment, for example, generates the second voltage V2 according to the first voltage V1. The first voltage V1 is, for example, a common electrode voltage used for driving the display area AA to display the image frame.

In the present embodiment, the driving circuit 320 includes a first resistor R1 and a second resistor R2. A first terminal of the first resistor R1 receives the first voltage V1. A second terminal of the first resistor R1 outputs the second voltage V2. The second resistor R2 has a first terminal and a second terminal. The first terminal of the second resistor R2 is coupled to the second terminal of the first resistor R1. The second terminal of the second resistor R2 is coupled to the ground voltage GND.

In the present embodiment, a combination of the first resistor R1 and the second resistor R2 of the driving circuit 320, for example, has a circuit configuration of a voltage-divining circuit. The combination of the first resistor R1 and the second resistor R2 divides the first voltage V1 to produce the second voltage V2, and the first voltage V1 is same to the second voltage. By using the voltage-dividing circuit, the absolute value of the first voltage V1 is decreased to the absolute value of the second voltage V2, such that the electro-phoretic particles are maintained to a predetermined position thereof. Therefore, in the present embodiment, the driving circuit 320 decreases the absolute value of the first voltage V1 to produce the absolute value of the second voltage V2, so that the absolute value of the second voltage V2 is lower than the absolute value of the first voltage V1. For example, in the present embodiment, the driving circuit 320, for example, adjusts the first voltage V1 of −2 volts (V) to the second voltage V2 of −1 V. The first voltage V1 and the second voltage V2 are all negative voltages, and the absolute value of the second voltage V2 is lower than the absolute value of the first voltage V1. In the present embodiment, the first voltage V1 of −2 V and the second voltage V2 of −1 V are only used as an example, and voltage values thereof are not limited by the invention.

In the present embodiment, the driving circuit 320, for example, drives the border area BD to maintain displaying the black border according to the second voltage V2. When the border area BD of the electro-phoretic display panel 110 is driven to display a back color, the driving circuit 320 outputs the second voltage V2 to the border area BD according to the first voltage V1, for example, adjusts the first voltage V1 of −2 V to the second voltage V2 of −1 V. Based on a voltage difference between the first voltage V1 and the second voltage V2, the black electro-phoretic particles are maintained to the predetermined position thereof, such that the border area BD maintains displaying the black border without distortion. Therefore, based on the border area BD maintaining displaying the black border, the border area BD serving as an alignment area may provide a clear position.

In summary, in the exemplary embodiment of the invention, the driving circuit drives the border area of the electro-phoretic display panel to display the white border or the black border according to the second voltage, so as to avoid a situation that the border area displays a gray color, and mitigate the distortion phenomenon.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electro-phoretic display apparatus, comprising:
   an electro-phoretic display panel, comprising a display area and a border area; and
   a driving circuit, coupled to the electro-phoretic display panel, and configured to drive the display area to display an image frame according to a first voltage, and drive the border area to maintain displaying a white border or a black border according to a second voltage,
   wherein the driving circuit generates the second voltage according to the first voltage,
   the border area includes black or white electro-phoretic particles, and a voltage difference between the first voltage and the second voltage drives the black or white electro-phoretic particles to be maintained to a predetermined position such that the border area maintains displaying the black or white border.

2. The electro-phoretic display apparatus as claimed in claim 1, wherein the driving circuit drives the border area to maintain displaying the white border according to the second voltage, and the driving circuit increases an absolute value of the first voltage to produce an absolute value of the second voltage, wherein the absolute value of the second voltage is higher than the absolute value of the first voltage.

3. The electro-phoretic display apparatus as claimed in claim 2, wherein the driving circuit comprising:
   an operation amplifier, having a first input terminal, a second input terminal and an output terminal, wherein the first input terminal of the operation amplifier receives the first voltage, and the output terminal of the operation amplifier outputs the second voltage;
   a first resistor, having a first terminal and a second terminal, wherein the first terminal of the first resistor is coupled to the output terminal of the operation amplifier, and the second terminal of the first resistor is coupled to the second input terminal of the operation amplifier; and
   a second resistor, having a first terminal and a second terminal, wherein the first terminal of the second resistor is coupled to the second input terminal of the operation amplifier, and the second terminal of the second resistor is coupled to a ground voltage.

4. The electro-phoretic display apparatus as claimed in claim 1, wherein the driving circuit drives the border area to maintain displaying the black border according to the second voltage, and the driving circuit decreases an absolute value of the first voltage to produce an absolute value of the second voltage, and the absolute value of the second voltage is lower than the absolute value of the first voltage.

5. The electro-phoretic display apparatus as claimed in claim 4, wherein the driving circuit comprises:
   a first resistor, having a first terminal and a second terminal, wherein the first terminal of the first resistor receives the first voltage, and the second terminal of the first resistor outputs the second voltage; and
   a second resistor, having a first terminal and a second terminal, wherein the first terminal of the second resistor is coupled to the second terminal of the first resistor, and the second terminal of the second resistor is coupled to a ground voltage.

6. The electro-phoretic display apparatus as claimed in claim 1, wherein the first voltage and the second voltage are negative voltages.

7. The electro-phoretic display apparatus as claimed in claim 1, wherein the first voltage is a common electrode voltage of the display area.

8. The electro-phoretic display apparatus as claimed in claim 1, wherein the driving circuit is disposed on the electro-phoretic display panel.

9. The electro-phoretic display apparatus as claimed in claim 1, wherein the driving circuit is disposed outside the electro-phoretic display panel.

* * * * *